United States Patent
Diaz et al.

(10) Patent No.: US 8,209,686 B2
(45) Date of Patent: Jun. 26, 2012

(54) SAVING UNSAVED USER PROCESS DATA IN ONE OR MORE LOGICAL PARTITIONS OF A COMPUTING SYSTEM

(75) Inventors: Joel D. Diaz, Durham, NC (US); Kevin S. Stansell, Raleigh, NC (US); Edward V. Zorek, Sr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 12/029,820

(22) Filed: Feb. 12, 2008

(65) Prior Publication Data
US 2009/0204962 A1    Aug. 13, 2009

(51) Int. Cl.
G06F 9/455 (2006.01)
G06F 1/00 (2006.01)

(52) U.S. Cl. ............................................ 718/1; 713/323

(58) Field of Classification Search .............. 718/1, 107, 718/108, 104; 709/1, 104; 711/6
See application file for complete search history.

(56) References Cited

U.S. PATENT DOCUMENTS

| | | | |
|---|---|---|---|
| 4,975,690 A | 12/1990 | Torres | |
| 5,742,778 A | 4/1998 | Hao et al. | |
| 6,535,996 B1 * | 3/2003 | Brewer et al. | 714/14 |
| 6,871,348 B1 | 3/2005 | Cooper | |
| 7,543,166 B2 * | 6/2009 | Zimmer et al. | 713/310 |
| 7,681,058 B2 * | 3/2010 | Kimura | 713/323 |
| 2002/0083110 A1 * | 6/2002 | Kozuch et al. | 709/1 |
| 2005/0060702 A1 * | 3/2005 | Bennett et al. | 718/1 |
| 2005/0097567 A1 | 5/2005 | Monnie et al. | |
| 2006/0004554 A1 * | 1/2006 | Vega et al. | 703/6 |
| 2007/0112999 A1 * | 5/2007 | Oney et al. | 711/6 |
| 2008/0163254 A1 * | 7/2008 | Cota-Robles et al. | 719/318 |
| 2008/0244292 A1 * | 10/2008 | Kumar et al. | 713/323 |
| 2009/0006728 A1 * | 1/2009 | Green | 711/104 |
| 2011/0202728 A1 * | 8/2011 | Nichols et al. | 711/141 |

* cited by examiner

Primary Examiner — Thomas Lee
Assistant Examiner — Phil Nguyen
(74) Attorney, Agent, or Firm — Brandon C. Kennedy; Cynthia G. Seal; Biggers & Ohanian, LLP (57) ABSTRACT

Methods, systems, and products are disclosed for saving unsaved user process data in one or more logical partitions ('LPARs') of a computing system, the computing system having installed upon it a hypervisor for administering the LPARs, each LPAR supporting an operating system, each operating system supporting one or more user processes, that include: detecting, by the hypervisor, a predefined event that the hypervisor interprets as an indication that unsaved data of user processes for at least one LPAR should be saved; transmitting, by the hypervisor in response to detecting the predefined event, a save instruction to the operating system supported by the LPAR; and instructing, by the operating system in response to receiving the save instruction, each user process supported by the operating system to save any unsaved data.

15 Claims, 5 Drawing Sheets

SAVING UNSAVED USER PROCESS DATA IN ONE OR MORE LOGICAL PARTITIONS OF A COMPUTING SYSTEM

BACKGROUND OF THE INVENTION

1. Field of the Invention

The field of the invention is data processing, or, more specifically, methods, apparatus, and products for saving unsaved user process data in one or more logical partitions ('LPARs') of a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is a software tool referred to as a 'hypervisor.' A hypervisor is a layer of system software that runs on the computer hardware beneath the operating system layer to allows multiple operating systems to run on a host computer at the same time. Hypervisors were originally developed in the early 1970's, when company cost reductions were forcing multiple scattered departmental computers to be consolidated into a single, larger computer— the mainframe—that would serve multiple departments. By running multiple operating systems simultaneously, the hypervisor brought a measure of robustness and stability to the system. Even if one operating system crashed, the others would continue working without interruption. Indeed, this even allowed beta or experimental versions of the operating system to be deployed and debugged without jeopardizing the stable main production system and without requiring costly second and third systems for developers to work on.

A hypervisor allows multiple operating systems to run on a host computer at the same time by providing each operating system with its own set of computer resources. These computer resources are typically virtualized counterparts to the physical resources of a computing system. A hypervisor allocates these resources to each operating system using logical partitions. A logical partition is a set of data structures and services that enables distribution of computer resources within a single computer to make the computer function as if it were two or more independent computers. Using a logical partition, therefore, a hypervisor provides a layer of abstraction between a computer hardware layer of a computing system and an operating system layer.

Each logical partition of a computing system typically supports an operating system, which in turn supports multiple user processes. In such a manner, hundreds of user processes may be supported on the computing system at any given moment. As the computing system executes the user processes, data of each user processes is manipulated in volatile computer memory, but is not always saved to non-volatile computer memory. Occasionally, a system event occurs precipitating the need for saving any unsaved user process data such as, for example, power interruption of partition migration. When these system events occur, a system administrator must manually interact with each user process to save any unsaved data. Manually interacting with each user process to save any unsaved data, however, is inefficient and costly because such manual interaction consumes large amounts of the system administrator's time.

SUMMARY OF THE INVENTION

Methods, systems, and products are disclosed for saving unsaved user process data in one or more logical partitions ('LPARs') of a computing system, the computing system having installed upon it a hypervisor for administering the LPARs, each LPAR supporting an operating system, each operating system supporting one or more user processes, that include: detecting, by the hypervisor, a predefined event that the hypervisor interprets as an indication that unsaved data of user processes for at least one LPAR should be saved; transmitting, by the hypervisor in response to detecting the predefined event, a save instruction to the operating system supported by the LPAR; and instructing, by the operating system in response to receiving the save instruction, each user process supported by the operating system to save any unsaved data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
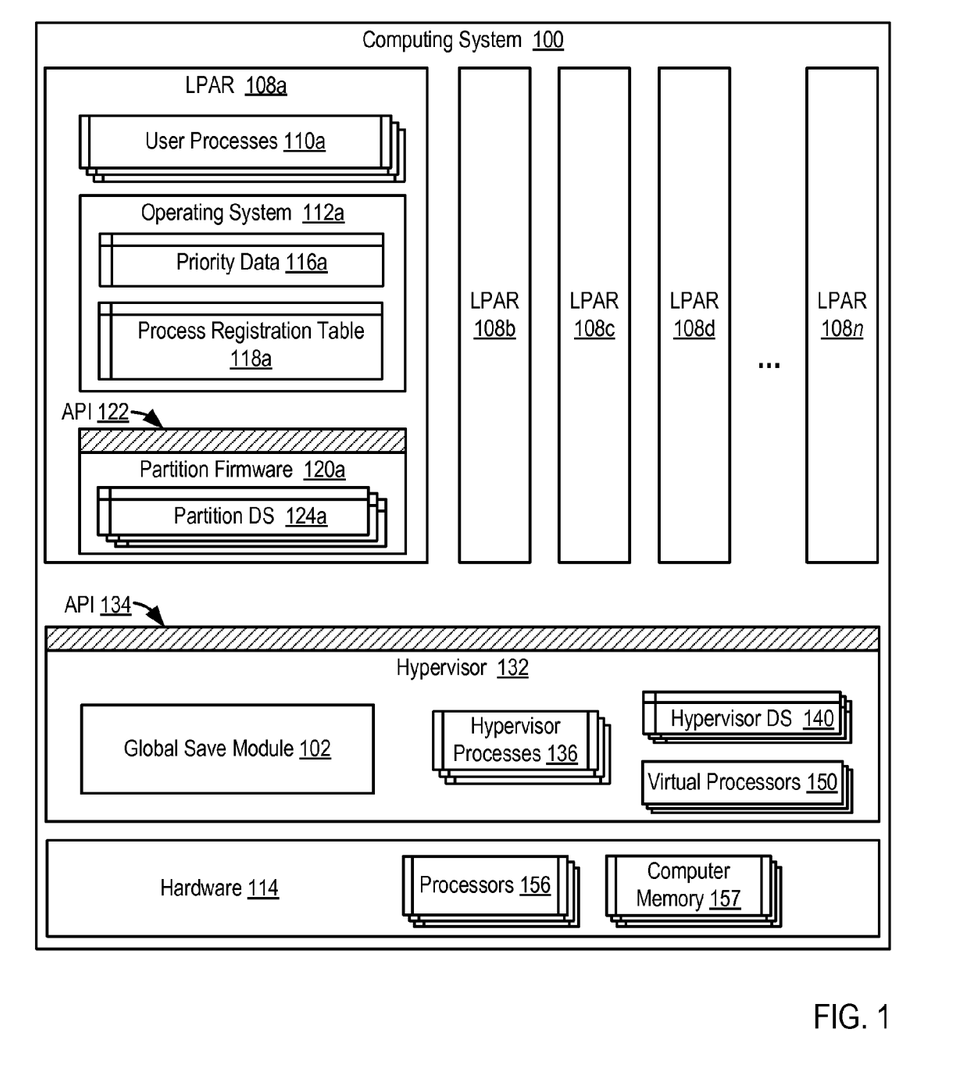
FIG. 1 sets forth a block diagram of an exemplary computing system for saving unsaved user process data in one or more logical partitions of the computing system according to embodiments of the present invention.

Exemplary methods, apparatus, and products for saving unsaved user process data in one or more LPARs of a computing system in accordance with the present invention are described with reference to the accompanying drawings, beginning with FIG. 1. FIG. 1 sets forth a block diagram of an exemplary computing system (100) for saving unsaved user process data in one or more LPARs of a computing system (100) according to embodiments of the present invention. The exemplary computing system (100) of FIG. 1 saves unsaved user process data in one or more LPARs (108) of a computing system as follows: The computing system (100) has installed upon it a hypervisor (132) for administering the LPARs (108). Each LPAR (108) supports an operating system (112), and each operating system (112) supports one or more user processes (110). The hypervisor (132) detects a predefined event that the hypervisor (132) interprets as an indication that unsaved data of user processes (110) for at least one LPAR (108) should be saved. In response to detecting the predefined event, the hypervisor (132) transmits a save instruction to the operating system (112) supported by the LPAR (108). In response to receiving the save instruction, the operating system (112) instructs each user process (110) supported by the operating system (112) to save any unsaved data.

In the example of FIG. 1, the computing system (100) includes several logical partitions (108). Each logical partition (108) provides an execution environment for user processes (110) and an operating system (112). Each user process (110) is a set of computer program instructions implementing user-level data processing. The operating system (112) of FIG. 1 is system software that manages the resources allocated to the logical partition (108) by the hypervisor (132). The operating system (112) performs basic tasks such as, for example, controlling and allocating virtual memory, prioritizing the processing of instructions, controlling virtualized input and output devices, facilitating networking, and managing a virtualized file system.

The hypervisor (132) of FIG. 1 is a layer of system software that runs on the computer hardware (114) beneath the operating system layer to allow multiple operating systems to run on a host computer at the same time. The hypervisor (132) provides each operating system with a set of computer resources using the logical partitions (108). A logical partition ('LPAR') is a set of data structures and services provided to a single operating system that enables the operating system to run concurrently with other operating systems on the same computer hardware. In effect, the logical partitions allow the distribution of computer resources within a single computer to make the computer function as if it were two or more independent computers.

The hypervisor (132) of FIG. 1 establishes each logical partition using a combination of data structures and services provided by the hypervisor (132) itself along with partition firmware (120) configured for each logical partition (108). The partition firmware (120) of FIG. 1 is system software specific to a particular partition (108) and is often referred to as a 'dispatchable hypervisor.' The partition firmware (120) maintains partition-specific data structures (124) and provides partition-specific services to the operating system (112) through an application programming interface ('API') (122). The hypervisor (132) maintains data structures (140) and provides services to the operating systems and partition firmware for each partition through API (134). Collectively, the hypervisor (132) and the partition firmware (120) are often referred to as 'firmware' because both the hypervisor (132) and the partition firmware (120) are typically implemented as firmware. Together the hypervisor (132) and the partition firmware (120) enforce logical partitioning between one or more operating systems (112) by storing state values in various hardware registers and other structures, which define the boundaries and behavior of the logical partitions (108). Using such state data, the hypervisor (132) and the partition firmware (120) may allocate memory to logical partitions (108), route input/output between input/output devices and associated logical partitions (108), provide processor-related services to logical partitions (108), and so on. Essentially, this state data defines the allocation of resources in logical partitions (108), and the allocation is altered by changes the state data rather than by physical reconfiguration of hardware (114).

In order to allow multiple operating systems to run at the same time, the hypervisor (132) assigns virtual processors (150) to the operating systems (112) running in the logical partitions (108) and schedules virtual processors (150) on one or more physical processors (156) of the computing system (100). A virtual processor (150) is a subsystem that implements assignment of processor time to a logical partition (108). A shared pool of physical processors (156) supports the assignment of partial physical processors (in time slices) to each logical partition (108). Such partial physical processors shared in time slices are referred to as 'virtual processors.' A thread of execution is said to run on a virtual processor when it is running on the virtual processor's time slice of the physical processors. Sub-processor partitions time-share a physical processor among a set of virtual processors, in a manner that is invisible to an operating system running in a logical partition. Unlike multiprogramming within the operating system where a thread can remain in control of the physical processor by running the physical processor in interrupt-disabled mode, in sub-processor partitions, the thread is still pre-empted by the hypervisor (132) at the end of its virtual processor's time slice, in order to make the physical processor available to a different virtual processor.

In the exemplary computing system (100) of FIG. 1, the hypervisor (132) has installed upon it a global save module (102). The global save module (102) of FIG. 1 is a set of computer program instructions for saving unsaved user process data in the LPARs (108) of a computing system according to embodiments of the present invention. The global save module (102) operates generally for saving unsaved user process data in the LPARs (108) of a computing system according to embodiments of the present invention by: detecting a predefined event that the hypervisor (132) interprets as an indication that unsaved data of user processes for at least one LPAR (108) should be saved and transmitting, in response to detecting the predefined event, a save instruction to the operating system supported by the LPAR. Unsaved data refers to data for a user process that is stored in volatile computer memory such as RAM, but not stored in non-volatile memory such as, for example, a disk drive or Electrically Erasable Programmable Read-Only Memory ('EEPROM'). The predefined event is an event for which a system administrator specifies saving any unsaved user process data upon the event's occurrence. Examples of a predefined event may include a migration event of one partition from one computing system to another, low battery event, excessive temperature event, a backup operation event, or simply an instruction from any process to the hypervisor to save any unsaved user process data.

Each operating system (112) of FIG. 1 also operates generally for saving unsaved user process data in the LPARs (108) of a computing system according to embodiments of the present invention. Each operating system (112) of FIG. 1 operates generally for saving unsaved user process data in the LPARs (108) of a computing system according to embodiments of the present invention by instructing, in response to receiving the save instruction, each user process supported by the operating system to save any unsaved data. Each operating system (112) may instruct each user process supported by the operating system to save any unsaved data by calling each callback function registered with the operating system (112). Each user process (110) supported by an operating system (112) may register a callback function with the operating system supporting that user process. The callback function for each user process (110) may be stored by the operating system (112) in a process registration table (118). Upon receiving a save instructions from the hypervisor (132), the operating system (112) then uses the callback function for each user process (110) to instruct that user process to save any unsaved data. In other embodiments, each operating system (112) may instruct each user process supported by the operating system to save any unsaved data by simulating user input that instructs that user process to save any unsaved data. For example, the operating system (112) may store an identifier for the 'Ctrl-S' keyboard instruction in the input buffer for each user process. The 'Ctrl-S' keyboard is a widely utilized user input that instructs user processes supported by Microsoft's Windows family of operating system to save any unsaved data.

The operating system (112) of FIG. 1 includes priority data (116). The priority data (116) of FIG. 1 specifies the order in which any unsaved data for each user process (110) supported by a particular operating system should be saved. The priority data (116) of FIG. 1 may be configured in each operating system (112) by a system administrator. Each operating system (112) may then instruct each user process supported by the operating system to save any unsaved data in dependence upon priority data (116) associated with each user process. In such a manner, unsaved data for user processes deemed more important to the system administrator may be saved before the unsaved data for other user processes deemed less important to the system administrator.

In the example of FIG. 1, the exemplary computing system (100) may be implemented as a blade server installed in a computer rack along with other blade servers. Each blade server includes one or more computer processors and computer memory operatively coupled to the computer processors. The blade servers are typically installed in server chassis that is, in turn, mounted on a computer rack. Readers will note that implementing the computing system (100) as blade server is for explanation and not for limitation. In fact, the computing system of FIG. 1 may be implemented as a workstation, a node of a computer cluster, a compute node in a parallel computer, or any other implementation as will occur to those of skill in the art.

Saving unsaved user process data in one or more LPARs of a computing system in accordance with the present invention is generally implemented with computers, that is, with automated computing machinery. For further explanation, therefore, FIG. 2 sets forth a block diagram of automated computing machinery comprising an exemplary computing system (100) useful in saving unsaved user process data in one or more LPARs of a computing system according to embodiments of the present invention. The computing system (100) of FIG. 2 includes at least one computer processor (156) or 'CPU' as well as random access memory (168) ('RAM') which is connected through a high speed memory bus (166) and bus adapter (158) to processor (156) and to other components of the computing system.

Figure 2:
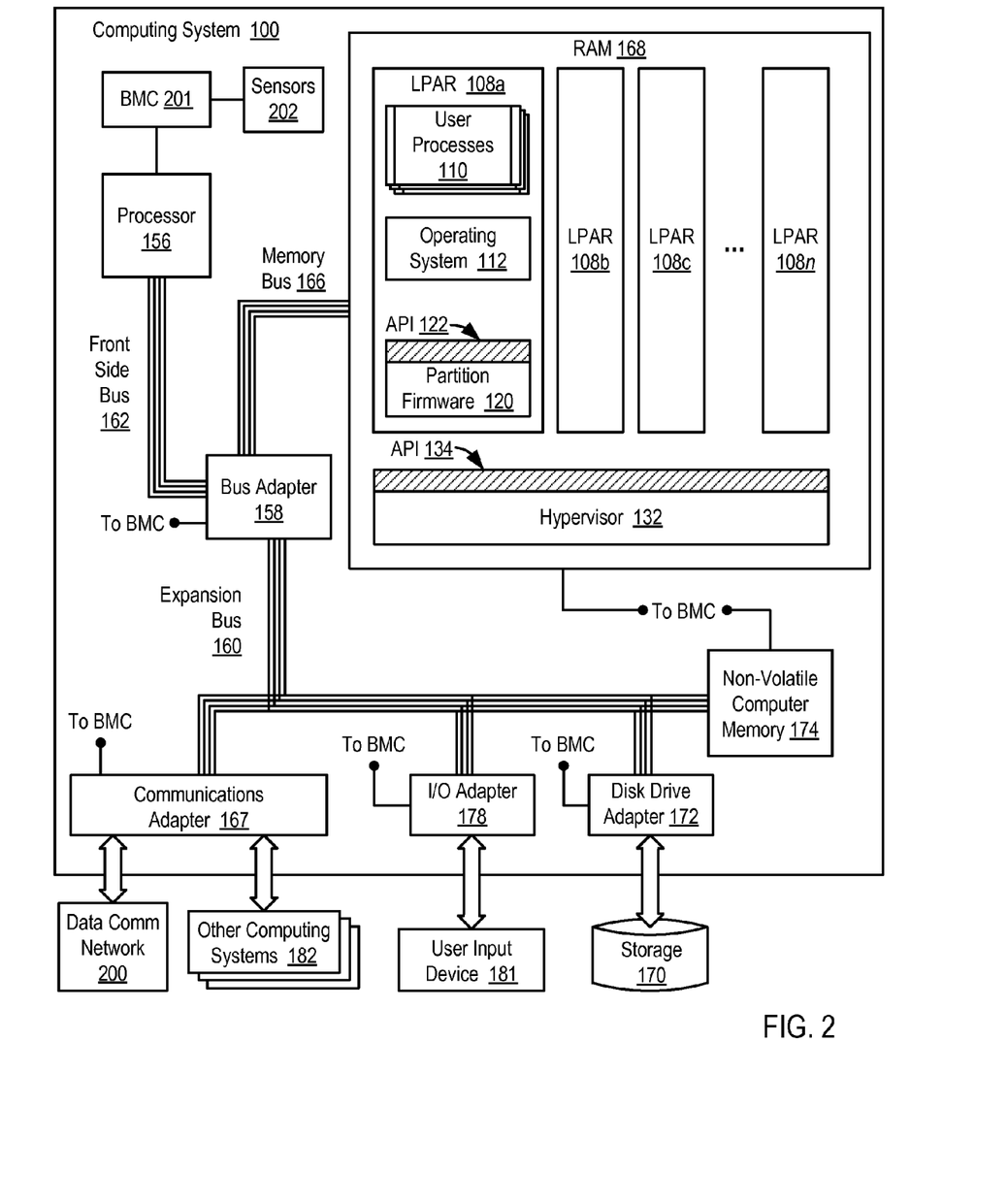
FIG. 2 sets forth a block diagram of automated computing machinery comprising an exemplary computing system useful in saving unsaved user process data in one or more logical partitions of a computing system according to embodiments of the present invention.

Stored in RAM (168) are logical partitions (108) and a hypervisor (132) that exposes an API (134). Each logical partition (108) is a set of data structures and services that enables distribution of computer resources within a single computer to make the computer function as if it were two or more independent computers. Each logical partition (108) includes user processes (110), an operating system (112), and partition firmware (120) that exposes an API (122). Operating systems useful in computing systems according to embodiments of the present invention include UNIX™, Linux™, Microsoft Vista™, IBM's AIX™, IBM's i5/OS™, and others as will occur to those of skill in the art.

The hypervisor (132) of FIG. 2 operates generally for saving unsaved user process data in one or more LPARs of a computing system according to embodiments of the present invention. The hypervisor (132) of FIG. 2 operates generally for saving unsaved user process data in one or more LPARs of a computing system according to embodiments of the present invention by: detecting a predefined event that the hypervisor interprets as an indication that unsaved data of user processes for at least one LPAR should be saved and transmitting, in response to detecting the predefined event, a save instruction to the operating system supported by the LPAR.

The operating system (112) of FIG. 2 operates generally for saving unsaved user process data in one or more LPARs of a computing system according to embodiments of the present invention. The operating system (112) of FIG. 2 operates generally for saving unsaved user process data in one or more LPARs of a computing system according to embodiments of the present invention by: instructing, in response to receiving the save instruction, each user process supported by the operating system to save any unsaved data.

The hypervisor (132) and the logical partitions (108), including the user processes (110), the operating system (112), the partition firmware (120) illustrated in FIG. 2 are software components, that is computer program instructions and data structures, that operate as described above with reference to FIG. 1. The hypervisor (132) and the logical partitions (108), including memory balancing module (102), applications (110), the operating system (112), the partition firmware (120) in the example of FIG. 2 are shown in RAM (168), but many components of such software typically are stored in non-volatile computer memory (174) or computer storage (170).

The exemplary computing system (100) of FIG. 2 includes a baseboard management controller ('BMC') (201). The BMC (201) of FIG. 2 is a specialized microcontroller embedded in computing systems that provides an interface between system management software and platform hardware. The BMC (201) monitors and manages the condition of the computer system (100) through signals received from sensors (202) and the other components of the computing system (100). The BMC (201) of FIG. 2 may be used by the hypervisor (132) to detect a predefined event that the hypervisor interprets as an indication that unsaved data of user processes for at least one LPAR should be saved. For example, as mentioned above, a predefined event may include the occurrence of a low battery condition. In such an example, the BMC (201) may receive a signal from the power supply that a low battery condition exists and notify the hypervisor (132) of the low battery condition.

In the example of FIG. 2, the BMC (201) connects to the various components of the computing system (100) through an out-of-band network ('OOBN'). The OOBN of FIG. 2 may be implemented as an I2C bus, for example, a multi-master serial computer bus invented by Philips that is used to attach low-speed peripherals to a motherboard or an embedded system. I2C is a simple, low-bandwidth, short-distance protocol that employs only two bidirectional open-drain lines, Serial Data (SDA) and Serial Clock (SCL), pulled up with resistors. Although the exemplary Computing system (100) may utilize the I2C protocol, readers will note this is for explanation and not for limitation. In addition to the I2C protocol, the OOBN may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on.

The exemplary computing system (100) of FIG. 2 includes bus adapter (158), a computer hardware component that contains drive electronics for high speed buses, the front side bus (162) and the memory bus (166), as well as drive electronics for the slower expansion bus (160). Examples of bus adapters useful in computing systems useful according to embodiments of the present invention include the Intel Northbridge, the Intel Memory Controller Hub, the Intel Southbridge, and the Intel I/O Controller Hub. Examples of expansion buses useful in computing systems useful according to embodiments of the present invention may include Peripheral Component Interconnect ('PCI') buses and PCI Express ('PCIe') buses.

Although not depicted in the exemplary computing system (100) of FIG. 2, the bus adapter (158) may also include drive electronics for a video bus that supports data communication between a video adapter and the other components of the computing system (100). FIG. 2 does not depict such video components because a computing system is often implemented as a blade server installed in a server chassis or a node in a parallel computer with no dedicated video support. Readers will note, however, that computing systems useful in embodiments of the present invention may include such video components.

The exemplary computing system (100) of FIG. 2 also includes disk drive adapter (172) coupled through expansion bus (160) and bus adapter (158) to processor (156) and other components of the exemplary computing system (100). Disk drive adapter (172) connects non-volatile data storage to the exemplary computing system (100) in the form of disk drive (170). Disk drive adapters useful in computing systems include Integrated Drive Electronics ('IDE') adapters, Small Computer System Interface ('SCSI') adapters, and others as will occur to those of skill in the art. In the exemplary computing system (100) of FIG. 2, non-volatile computer memory (174) is connected to the other components of the computing system (100) through the bus adapter (158). In addition, the non-volatile computer memory (174) may be implemented for a computing system as an optical disk drive, electrically erasable programmable read-only memory (so-called 'EEPROM' or 'Flash' memory), RAM drives, and so on, as will occur to those of skill in the art.

The exemplary computing system (100) of FIG. 2 includes one or more input/output ('I/O') adapters (178). I/O adapters in computing systems implement user-oriented input/output through, for example, software drivers and computer hardware for controlling output to display devices such as computer display screens, as well as user input from user input devices (181) such as keyboards and mice. Although not depicted in the example of FIG. 2, computing systems in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus.

The exemplary computing system (100) of FIG. 2 includes a communications adapter (167) for data communications with other computing systems (182) and for data communications with a data communications network (200). Such data communications may be carried out through Ethernet™ connections, through external buses such as a Universal Serial Bus ('USB'), through data communications networks such as IP data communications networks, and in other ways as will occur to those of skill in the art. Communications adapters implement the hardware level of data communications through which one computing system sends data communications to another computing system, directly or through a data communications network. Examples of communications adapters useful for saving unsaved user process data in one or more LPARs of a computing system according to embodiments of the present invention include modems for wired dial-up communications, IEEE 802.3 Ethernet adapters for wired data communications network communications, and IEEE 802.11b adapters for wireless data communications network communications.

Figure 3:
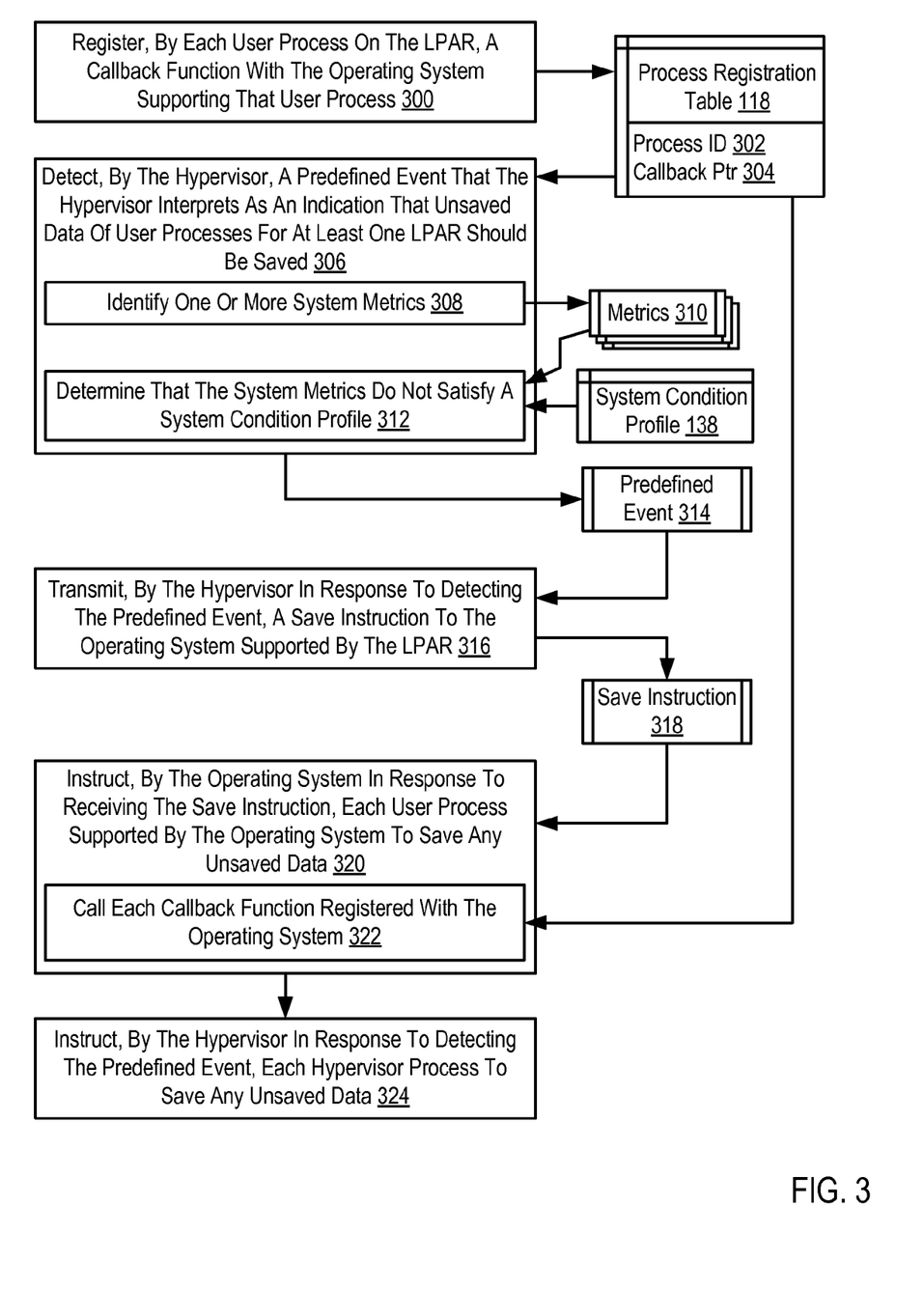
FIG. 3 sets forth a flow chart illustrating an exemplary method for saving unsaved user process data in one or more LPARs of a computing system according to embodiments of the present invention.

For further explanation, FIG. 3 sets forth a flow chart illustrating an exemplary method for saving unsaved user process data in one or more LPARs of a computing system according to embodiments of the present invention. The computing system described with reference to FIG. 3 has installed upon it a hypervisor for administering the LPARs. Each LPAR supports an operating system, and each operating system supports one or more user processes.

The method of FIG. 3 includes registering (300), by each user process on the LPAR, a callback function with the operating system supporting that user process. The callback function may be used by the operating system to instruct that user process to save any unsaved data. Each user process on the LPAR may register (300) a callback function with the operating system supporting that user process according to the method of FIG. 3 by providing the operating system with a pointer to the user process' callback function, typically by including the pointer as an argument in an operating system function invoked by the user process during initialization. Upon receiving the pointer to the user process' callback function, the operating system may associate the user process' callback pointer with a process identifier for that user process in a process registration table (118). The process registration table (118) of FIG. 3 includes a process identifier field (302) and a callback pointer field (304) for associating a process identifier with a callback pointer.

The method of FIG. 3 also includes detecting (306), by the hypervisor, a predefined event (314) that the hypervisor interprets as an indication that unsaved data of user processes for at least one LPAR should be saved. The hypervisor may detect (306) a predefined event (314) according to the method of FIG. 3 identifying (308) one or more system metrics (310) for the computing system and determining (312) that the system metrics (310) do not satisfy a system condition profile (138). Each system metric (310) of FIG. 3 represents an aspect of a condition of the computing system. For example, a system metric may represent the temperature of air surrounding temperature sensitive components of the computing system, the power level of the batteries of the computing system, the vibration level of system components, and so on. The system condition profile (138) of FIG. 3 specifies one or more rules for determining whether the computing system is operating within acceptable criteria. For example, the system condition profile (138) may specify that the computing system is operating within acceptable criteria when the processor temperature is below 95 degrees Celsius or when the battery power level is above two percent. In such a manner, the system condition profile (138) may indicate when the computing system is about to fail due to the computing system's operation outside of acceptable criteria.

The hypervisor may identify (308) one or more system metrics (310) for the computing system according to the method of FIG. 3 by receiving system notifications from a baseboard management controller that aggregates diagnostics and system information from various sensors and other components installed in the computing system. The hypervisor may determine (312) that the system metrics (310) do not satisfy a system condition profile (138) according to the method of FIG. 3 by applying the rules specified in the system condition profile (138) to the system metrics (310) and determining whether the rules are satisfied by the system metrics (310). If the rules are satisfied by the system metrics (310), then the system metrics (310) satisfy the system condition profile (138). If the rules are not satisfied by the system metrics (310), then the system metrics (310) do not satisfy the system condition profile (138).

Because a predefined event may by implemented in various ways, readers will note that detecting (306) a predefined event (314) by identifying (308) one or more system metrics (310) for the computing system and determining (312) that the system metrics (310) do not satisfy a system condition profile (138) is for explanation only and not for limitation. In fact, other ways of detecting (306) a predefined event (314) as will occur to those of skill in the art may also be useful in embodiments of the present invention. For example, the hypervisor may detect (306) a predefined event (314) by receiving an instruction for a system backup application to save any unsaved user process data before the backup operation is performed. In such an example the predefined event is the receipt of an instruction to save any unsaved user process data before the backup operation is performed. Still further, the hypervisor may detect (306) a predefined event (314) by identifying that a logical partition on the computing system needs to be migrated to another computing system. In such an example, the predefined event is the identification that a partition migration should occur.

The method of FIG. 3 includes transmitting (316), by the hypervisor in response to detecting the predefined event (314), a save instruction (318) to the operating system supported by the LPAR. The save instruction (318) of FIG. 3 represents an instruction from the hypervisor to the operating system of a LPAR instructing the operating system to, in turn, instruct the user processes supported by the operating system to save any unsaved data. The hypervisor may transmit (316) a save instruction (318) to the operating system supported by the LPAR according to the method of FIG. 3 by invoking a function in the API of the operating system. Although the description above describes transmitting a save instruction to a single operating system in a single LPAR, readers will note that the hypervisor may transmit a save instruction to operating systems in multiple LPARs depending on the predefined event (314). For example, if the predefined event relates to the migration of a single LPAR, then the hypervisor may only transmit the save instruction to the operating system on that LPAR. If, however, the predefined event relates to a low battery condition, then the hypervisor may transmit the save instruction to the operating system for each of the LPARs in the computing system.

The method of FIG. 3 also includes instructing (320), by the operating system in response to receiving the save instruction (318), each user process supported by the operating system to save any unsaved data. The operating system may instruct (320) each user process to save any unsaved data according to the method of FIG. 3 by calling (322) each callback function registered with the operating system. The hypervisor may call (322) each callback function registered with the operating system according to the method of FIG. 3 by traversing the process registration table (118) for the operating system and invoking the callback functions specified by callback pointer field (304) in the process registration table (118).

In the example of FIG. 3, the hypervisor directly supports one or more hypervisor processes in a manner similar to the way in which each operating system supports one or more user processes. When a predefined event occurs that precipitate saving all unsaved data in the computing system, the hypervisor may also operate according to the present invention to save any unsaved hypervisor process data. The method of FIG. 3 therefore includes instructing (324), by the hypervisor in response to detecting the predefined event, each hypervisor process to save any unsaved data. The hypervisor may instruct (324) each hypervisor process to save any unsaved data according to the method of FIG. 3 in the same manner described above as the operating system instructing each user process to save any unsaved data. For example, the hypervisor may instruct (324) each hypervisor process to save any unsaved data according to the method of FIG. 3 by traversing a hypervisor process registration table (not shown) for the hypervisor and invoking the callback functions specified by a callback pointer field in the hypervisor process registration table.

Although the explanation above of how an operating system may instruct each user process supported by that operating system to save any unsaved data includes calling a callback function registered with the operating system, readers will note that an operating system may utilize other ways of instructing each user process supported by that operating system to save any unsaved data. For further explanation, therefore, FIG. 4 sets forth a flow chart illustrating a further exemplary method for saving unsaved user process data in one or more LPARs of a computing system according to embodiments of the present invention. The computing system described with reference to FIG. 4 has installed upon it a hypervisor for administering the LPARs. Each LPAR supports an operating system, and each operating system supports one or more user processes.

Figure 4:
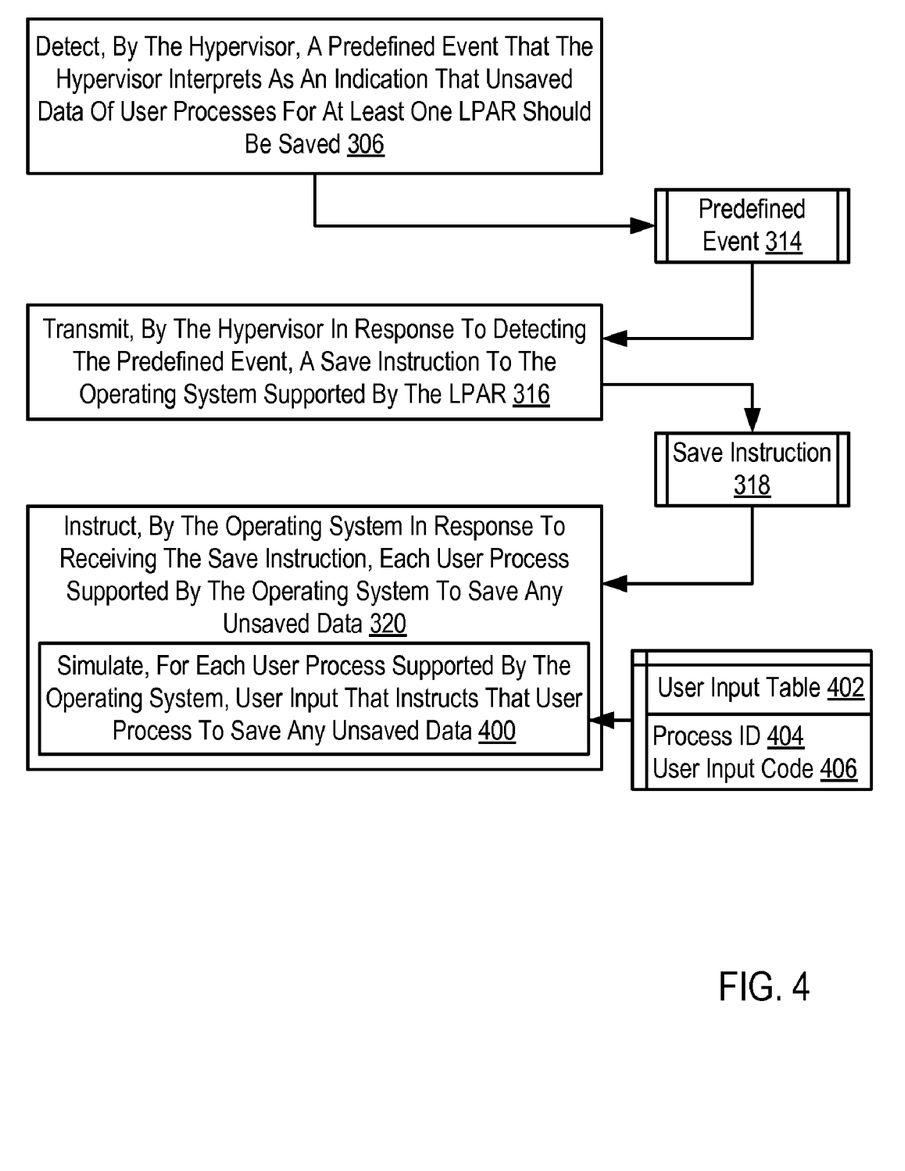
FIG. 4 sets forth a flow chart illustrating a further exemplary method for saving unsaved user process data in one or more LPARs of a computing system according to embodiments of the present invention.

The method of FIG. 4 is similar to the method of FIG. 3. That is, the method of FIG. 4 includes: detecting (306), by the hypervisor, a predefined event (314) that the hypervisor interprets as an indication that unsaved data of user processes for at least one LPAR should be saved; transmitting (316), by the hypervisor in response to detecting the predefined event (314), a save instruction (318) to the operating system supported by the LPAR; and instructing (320), by the operating system in response to receiving the save instruction (318), each user process supported by the operating system to save any unsaved data.

The method of FIG. 4 differs from the method of FIG. 3, however, in that the operating system instructs (320) each user process supported by the operating system to save any unsaved data according to the method of FIG. 4 by simulating (400), for each user process supported by the operating system, user input that instructs that user process to save any unsaved data. The operating system may simulate (400) user input that instructs that user process to save any unsaved data according to the method of FIG. 4 by looking up the user input code associated with the identifier for each process in a user input table (402) of the operating system and injecting the user input code for a particular user process into the user process' input buffer. The user input table (402) of FIG. 4 includes a process identifier field (404) and a user input code field (406) for associating user process identifiers with user input codes that instruct the corresponding user processes to save any unsaved data. For example, a user input code may be implemented as an identifier for the 'Ctrl-S' keyboard instruction for a user process supported by Microsoft's Windows XP™ operating system. Similarly, a user input code may be implemented as an identifier for the 'Cmd-S' keyboard instruction for a user process supported by Apple's OS X™ operating system. The user input codes included in the operating system's user input table (402) may be downloaded from the operating system provider's servers that connect to the computing system through a data communications network. In other embodiments, a system administrator may specify each user process' user input code for saving unsaved data. Still further, other ways of populating the operating system's user input table (402) are also well within the scope of the present invention.

In some embodiments of the present invention, a system administrator may prefer that the unsaved data for certain critical user processes be saved before the unsaved data for less critical user processes. For further explanation, therefore, FIG. 5 sets forth a flow chart illustrating a further exemplary method for saving unsaved user process data in one or more LPARs of a computing system according to embodiments of the present invention. The computing system described with reference to FIG. 5 has installed upon it a hypervisor for administering the LPARs. Each LPAR supports an operating system, and each operating system supports one or more user processes.

Figure 5:
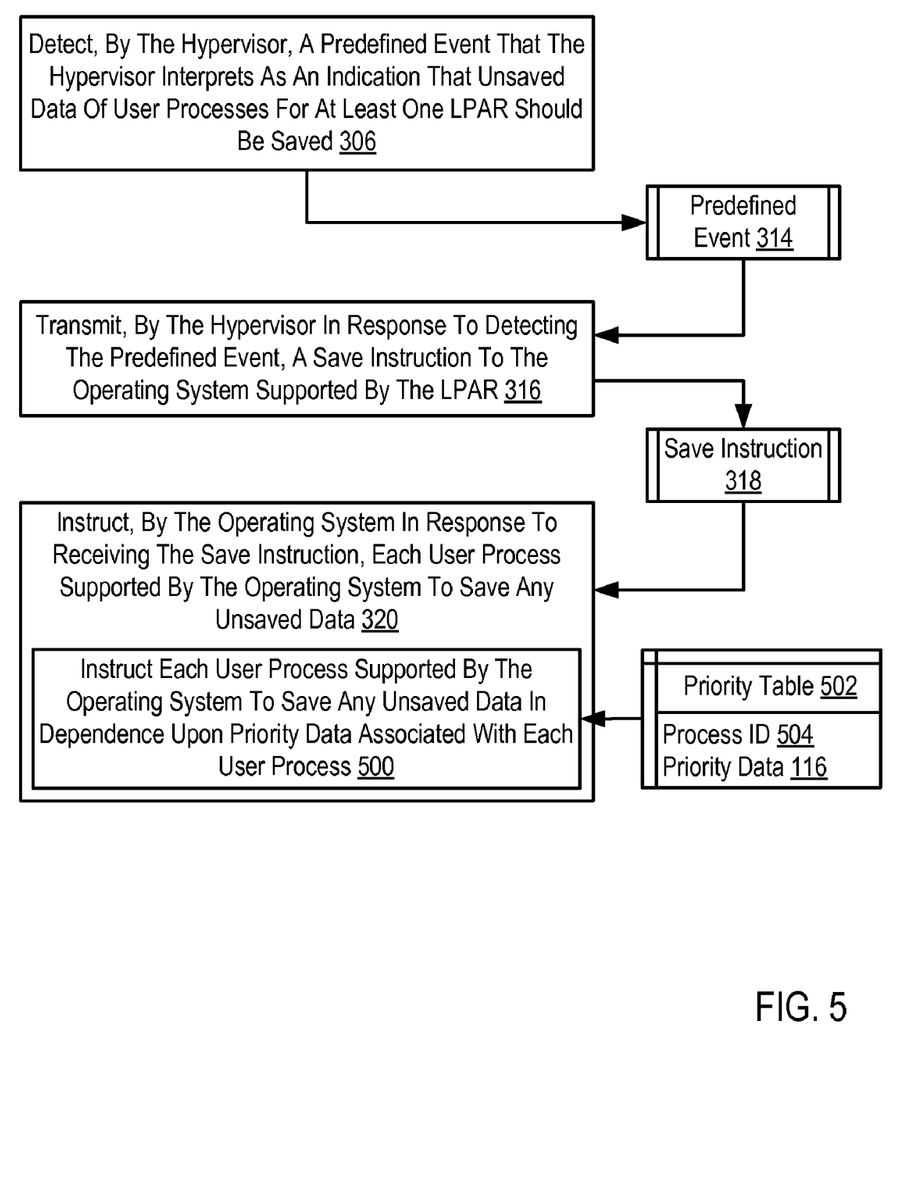
FIG. 5 sets forth a flow chart illustrating a further exemplary method for saving unsaved user process data in one or more LPARs of a computing system according to embodiments of the present invention.

The method of FIG. 5 is similar to the method of FIG. 3. That is, the method of FIG. 5 includes: detecting (306), by the hypervisor, a predefined event (314) that the hypervisor interprets as an indication that unsaved data of user processes for at least one LPAR should be saved; transmitting (316), by the hypervisor in response to detecting the predefined event (314), a save instruction (318) to the operating system supported by the LPAR; and instructing (320), by the operating system in response to receiving the save instruction (318), each user process supported by the operating system to save any unsaved data.

The method of FIG. 5 differs from the method of FIG. 3, however, in that the operating system instructs (320) each user process supported by the operating system to save any unsaved data according to the method of FIG. 5 by instructing (500) each user process supported by the operating system to save any unsaved data in dependence upon priority data (116) associated with each user process. The priority data (116) associated with each user process specifies the order in which the operating system instructs that user process to save any unsaved data in relations to the other processes supported by that operating system. For example, the priority data (116) may be implemented as an integer. The operating system may save unsaved data for user processes associated with lower integers before saving unsaved data for user processes associated with higher integers. The operating system may instruct (500) each user process supported by the operating system to save any unsaved data in dependence upon priority data (116) associated with each user process according to the method of FIG. 5 by invoking callback functions for user processes associated with the priority data (116) in the order specified by the priority data (116). For example, consider the following exemplary priority table:

| EXEMPLARY PRIORITY TABLE | |
| --- | --- |
| PROCESS ID | PRIORITY DATA |
| P0 | 4 |
| P1 | 2 |
| P2 | 1 |
| P3 | 5 |
| P4 | 3 |

Using the exemplary priority table above, the operating system may save unsaved data for user processes associated with lower integers before saving unsaved data for user processes associated with higher integers. Based on the exemplary priority table above, the operating system invokes callback functions that instruct the user processes to save any unsaved data in the following order: the callback function for user process 'P2,' the callback function for user process 'P1,' the callback function for user process 'P4,' the callback function for user process 'P0,' and the callback function for user process 'P3.' Readers will note that the exemplary table above is for explanation only and not for limitation. Readers will also note that implementing priority data as an integer is also for explanation only and not for limitation. In fact, priority data may also be implemented as a set of rules used to determine the order in which unsaved user process data for a particular user process should be saved, a bit mask, or any other implementation as will occur to those of skill in the art.

Exemplary embodiments of the present invention are described largely in the context of a fully functional computer system for saving unsaved user process data in one or more LPARs of a computing system. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of saving unsaved user process data in one or more logical partitions ('LPARs') of a computing system, the computing system having installed upon it a hypervisor for administering the LPARs, each LPAR supporting an operating system, each operating system supporting one or more user processes, the method comprising:

detecting, by the hypervisor, a predefined event that the hypervisor interprets as an indication that unsaved data of user processes for at least one LPAR should be saved;

transmitting, by the hypervisor in response to detecting the predefined event, a save instruction to the operating system supported by the LPAR;

instructing, by the operating system in response to receiving the save instruction, each user process supported by the operating system to save any unsaved data; and registering, by each user process on the LPAR, a callback function with the operating system supporting that user process, the callback function instructing that user process to save any unsaved data; and instructing, by the operating system in response to receiving the save instruction, each user process supported by the operating system to save any unsaved data further comprising calling each callback function registered with the operating system.

2. The method of claim 1 wherein instructing, by the operating system in response to receiving the save instruction, each user process supported by the operating system to save any unsaved data further comprises simulating, for each user process supported by the operating system, user input that instructs the user process to save any unsaved data.

3. The method of claim 1 wherein instructing, by the operating system in response to receiving the save instruction, each user process supported by the operating system to save any unsaved data further comprises instructing each user process supported by the operating system to save any unsaved data in dependence upon priority data associated with each user process.

4. The method of claim 1 wherein the hypervisor directly supports one or more hypervisor processes and the method further comprises instructing, by the hypervisor in response to detecting the predefined event, each hypervisor process to save any unsaved data.

5. The method of claim 1 wherein detecting, by the hypervisor, a predefined event that the hypervisor interprets as an indication that unsaved data of user processes for at least one LPAR should be saved further comprises:

identifying one or more system metrics, each system metric representing an aspect of a condition of the computing system; and determining that the system metrics do not satisfy a system condition profile.

6. A computing system for saving unsaved user process data in one or more logical partitions ('LPARs') of the computing system, the computing system having installed upon it a hypervisor for administering the LPARs, each LPAR supporting an operating system, each operating system supporting one or more user processes, the computing system comprising a computer processor, a computer memory operatively coupled to the computer processor, the computer memory having disposed within it computer program instructions capable of:

detecting, by the hypervisor, a predefined event that the hypervisor interprets as an indication that unsaved data of user processes for at least one LPAR should be saved;

transmitting, by the hypervisor in response to detecting the predefined event, a save instruction to the operating system supported by the LPAR;

instructing, by the operating system in response to receiving the save instruction, each user process supported by the operating system to save any unsaved data; and registering, by each user process on the LPAR, a callback function with the operating system supporting that user process, the callback function instructing that user process to save any unsaved data; and instructing, by the operating system in response to receiving the save instruction, each user process supported by the operating system to save any unsaved data further comprising calling each callback function registered with the operating system.

7. The computing system of claim 6 wherein instructing, by the operating system in response to receiving the save instruction, each user process supported by the operating system to save any unsaved data further comprises simulating, for each user process supported by the operating system, user input that instructs the user process to save any unsaved data.

8. The computing system of claim 6 wherein instructing, by the operating system in response to receiving the save instruction, each user process supported by the operating system to save any unsaved data further comprises instructing each user process supported by the operating system to save any unsaved data in dependence upon priority data associated with each user process.

9. The computing system of claim 6 wherein the hypervisor directly supports one or more hypervisor processes and the method further comprises instructing, by the hypervisor in response to detecting the predefined event, each hypervisor process to save any unsaved data.

10. The computing system of claim 6 wherein detecting, by the hypervisor, a predefined event that the hypervisor interprets as an indication that unsaved data of user processes for at least one LPAR should be saved further comprises:

identifying one or more system metrics, each system metric representing an aspect of a condition of the computing system; and determining that the system metrics do not satisfy a system condition profile.

11. A computer program product for saving unsaved user process data in one or more logical partitions ('LPARs') of a computing system, the computing system having installed upon it a hypervisor for administering the LPARs, each LPAR supporting an operating system, each operating system supporting one or more user processes, the computer program product comprising a computer readable non-transmission medium that includes computer program instructions capable of:

detecting, by the hypervisor, a predefined event that the hypervisor interprets as an indication that unsaved data of user processes for at least one LPAR should be saved;

transmitting, by the hypervisor in response to detecting the predefined event, a save instruction to the operating system supported by the LPAR;

instructing, by the operating system in response to receiving the save instruction, each user process supported by the operating system to save any unsaved data; and registering, by each user process on the LPAR, a callback function with the operating system supporting that user process, the callback function instructing that user process to save any unsaved data; and instructing, by the operating system in response to receiving the save instruction, each user process supported by the operating system to save any unsaved data further comprising calling each callback function registered with the operating system.

12. The computer program product of claim 11 wherein instructing, by the operating system in response to receiving the save instruction, each user process supported by the operating system to save any unsaved data further comprises simulating, for each user process supported by the operating system, user input that instructs the user process to save any unsaved data.

13. The computer program product of claim 11 wherein instructing, by the operating system in response to receiving the save instruction, each user process supported by the operating system to save any unsaved data further comprises instructing each user process supported by the operating system to save any unsaved data in dependence upon priority data associated with each user process.

14. The computer program product of claim 11 wherein the hypervisor directly supports one or more hypervisor processes and the method further comprises instructing, by the hypervisor in response to detecting the predefined event, each hypervisor process to save any unsaved data.

15. The computer program product of claim 11 wherein detecting, by the hypervisor, a predefined event that the hypervisor interprets as an indication that unsaved data of user processes for at least one LPAR should be saved further comprises:
- identifying one or more system metrics, each system metric representing an aspect of a condition of the computing system; and
- determining that the system metrics do not satisfy a system condition profile.

* * * * *